(No Model.)
S. FARWELL.
PREPARING ORANGES, &c., FOR SHIPMENT.
No. 416,834. Patented Dec. 10, 1889.
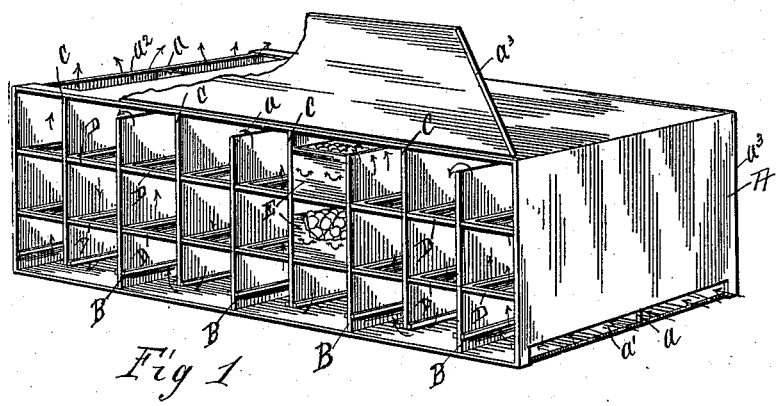
Fig 1
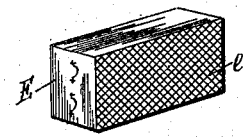
Fig 2
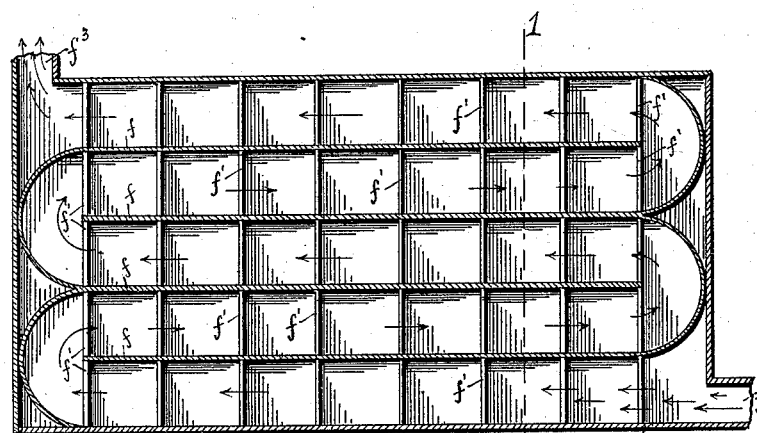
Fig 3
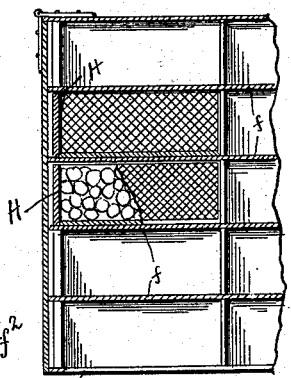
Fig 4
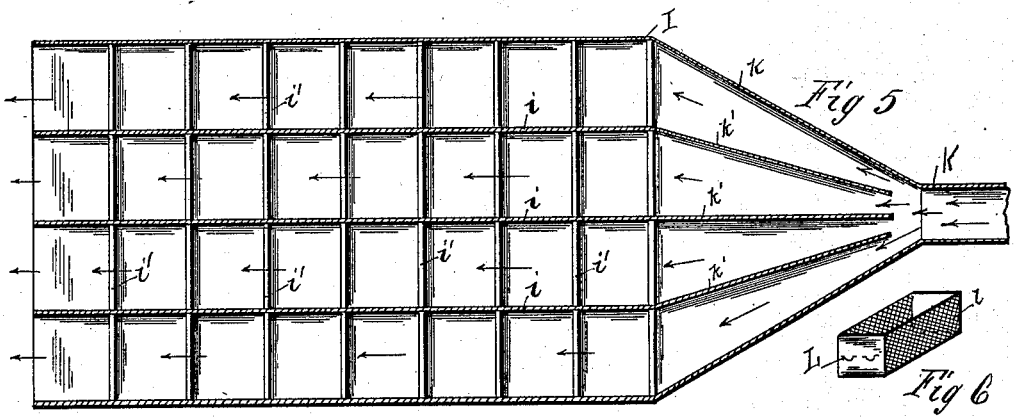
Fig 5
Fig 6
Witnesses
A. M. Best
C. Feigel.
Inventor
Simeon Farwell
By Coburn & ——
Attys

UNITED STATES PATENT OFFICE.

SIMEON FARWELL, OF EVANSTON, ILLINOIS.

PREPARING ORANGES, &c., FOR SHIPMENT.

SPECIFICATION forming part of Letters Patent No. 416,834, dated December 10, 1889.

Application filed March 20, 1889. Serial No. 304,027. (No model.)

*To all whom it may concern:*

Be it known that I, SIMEON FARWELL, a citizen of the United States, residing at Evanston, in the county of Cook and State of Illinois, have invented a certain new and useful Improvement in Process for Preparing Oranges and other Like Fruits for Shipment, which is fully set forth in the following specification, reference being had to the accompanying drawings, in which—

Figure 1 represents a perspective view of a device for carrying out my invention; Fig. 2, a perspective view of a fruit-box for use with the same; Fig. 3, a vertical section of the device modified in construction; Fig. 4, a cross-section of the same, taken on the line 1 1 of Fig. 2 and broken away at one side; Fig. 5, a vertical section of still another modification, and Fig. 6 a perspective view of the fruit-box for use with the same.

The temperature of some tropical countries which produce oranges and other like fruits is, of course, comparatively high, and in most cases the atmosphere is also humid. The fruit, when picked, is therefore warm and moist, and when packed for transportation in this condition the liability to decay is very great, even though the precaution of wrapping the fruit be employed. It is well known that there is a large percentage of loss from decay in the transportation of this class of fruits.

It is the object of my invention to obviate this difficulty and save this loss by certain treatment of the fruit before packing, whereby its tendency to decay will be greatly lessened.

The invention consists in submitting the fruit before packing to a current of cool air, whereby the moisture is removed from the rind and the latter somewhat hardened, after which the fruit is packed in any usual way. Oranges and similar fruits thus treated will stand the ordinary vicissitudes of transportation with very little danger from loss by decay.

The apparatus by means of which my process may be carried out is immaterial, and it is obvious that its construction may be widely varied. It is only necessary that the fruit be exposed to a current of cool air, more or less confined, so as to make something of a blast, and that the fruit shall be separated or loosely held in suitable receptacles, so that the air may pass freely about every single orange or other fruit that may be treated.

In the drawings I have shown an apparatus adapted to the application of my process; but this is given for the purpose of illustrating some means of carrying out the process practically, and I do not wish to be understood as limiting myself to the construction here shown or any other construction of devices for the purpose.

In Fig. 1 of the drawings, A represents a case of rectangular form, which is divided lengthwise by a vertical partition $a$, running its entire length and dividing the compartment into two separate spaces on each side of the structure. In the interior of the case there are also set upon the bottom vertical cross-partitions B, which extend nearly to the top of the case, and also similar partitions C, which depend from the top and extend nearly to the bottom, being arranged between the partitions B. It will thus be seen that a passage is made from one end of the case to the other, alternately over and under these cross-partitions. The spaces between the cross-partitions are also divided by one or more horizontal partitions D, which, however, are skeleton in construction, being cut almost entirely away between the partitions. It will be seen that the space within the case on each side of the central partition is thus divided into small rectangular compartments. Small boxes or receptacles E, Fig. 2, are provided, fitting these compartments in the sides of the case. The boxes are open at the top and have a bottom $e$, of coarse wire mesh or grating. At one end of the case, which may be called the "front end," there is a long narrow opening $a'$, cut at the bottom edge of the end piece, which constitutes an air-passage into the lower portion of the first compartment, the first cross-partition at this end being set on the bottom. At the opposite end of the case there is a similar opening $a^2$ in the top of the box, which provides an air-opening out from the upper portion of the last compartment, the last cross-partition at this end being one depending from the top.

The sides $a^3$ may be hinged at one edge or the other for conveniently opening the case to introduce and remove the fruit-boxes.

The boxes are loosely filled with oranges or other like fruit and set within the openings in the case on each side, and the sides of the case are then closed. Obviously, if a current of air is now introduced into the case at the lower opening $a'$, it will pass up through the boxes of fruit in the first division, the grated bottoms of the boxes permitting this operation; thence over the top of the first partition and down through the boxes in the next division, and so on until it finally escapes from the openings $a^2$ in the top at the other end of the case. The blast or current of cool air may be supplied by a blower or any other suitable apparatus. I have not shown anything of this kind in the drawings, for various devices of this nature are well known and in common use. It will be understood, of course, that whatever mechanism is used to produce the current must be connected by suitable air-conduits with the end openings $a'$ into the case. The blower being put in operation, a constant current of air will be driven through the fruit-receptacles, and coming in contact with the fruit will carry off all surface-moisture, and if continued a little time will slightly dry and harden the rind of the fruit. Inspection will show when this process has been carried sufficiently far for practical purposes. Of course it must not be continued long enough to seriously dry the rind. The oranges or other fruit should then be packed in boxes at once in the ordinary way. It will be found that oranges or other similar fruit thus treated will be much less liable to decay during transportation than when packed in the usual way. The fruit-receptacles may be made large enough to accommodate only a single layer of the fruit or more, as may be found necessary for successfully drying and hardening the surface.

The remaining figures of the drawings simply illustrate modifications in the construction of the case, the principle of operation being the same. In Figs. 3 and 4 the case F is divided by the longitudinal partition, as described above, but the space on each side thereof is divided by horizontal partitions $f$ and skeleton vertical partitions $f'$. The partitions $f$ may extend alternately to each end of the case, or, as shown in the drawings, they may simply extend to the outer cross-partition at each end, in which case a circular diaphragm or guide G connects the ends of the alternate horizontal partitions, as seen in Fig. 3 of the drawings, thereby making a passage back and forth from one horizontal division to another. The air-inlet $f^2$ is at the bottom of the front end of the box, as before, and the outlet $f^3$ is located at the top of the other end. In this instance the sides of the fruit-box H must be grated, while the tops and bottoms may be solid, as the direction of the air-current in this case is horizontal, and consequently must be through the sides of the fruit-boxes. In Fig. 5 the case I is divided by horizontal partitions $i$ and skeleton cross-partitions $i'$, thereby dividing off the space into a series of horizontal compartments having no connection with each other above and below. The ends of the case are open. In this instance air-blast pipe K is enlarged or funnel-shaped at its delivery end, so as to cover with the funnel $k$ the entire front end of the case. The interior of the funnel is also divided by partitions $k'$, running nearly to the small end of the funnel into smaller spaces or conduits corresponding to the horizontal divisions of the case. It will be seen, then, that the volume of air coming through the air-pipe is subdivided and a portion driven through each of the horizontal compartments in the case, escaping at the rear end thereof. The fruit-boxes L in this instance must have their sides $l$ grated to permit the passage of air.

The operation is practically the same in all these instances, and the direction of the currents of air is shown by arrows in each of the figures.

Other modifications may be made in the apparatus, it being necessary only to provide a structure which will permit the application of the cool-air currents to the fruit, as indicated above.

In the description above I have stated that cool air is employed, and I have used this term "cool" simply to indicate that the air is not to be artificially heated; but I do not mean by this term that the air is to be cooled—that is, artificially chilled. I mean, simply, that the air is to be used in its natural condition.

Having thus described my invention, what I claim as new, and desire to secure by Letters Patent, is—

The herein-described process for preparing oranges and other like fruit for shipment, which consists in submitting the fresh fruit whole to the action of a current or blast of cool air immediately before packing, whereby the fruit is cooled and the skin slightly dried and hardened, substantially as and for the purposes specified.

SIMEON FARWELL.

Witnesses:
CARRIE FEIGEL,
IRVINE MILLER.